Oct. 1, 1940.   C. K. STILLWAGON   2,216,577
COMBINATION PISTON AND ROD
Filed March 17, 1938

Inventor
Crawford K. Stillwagon

By Edward V. Hardway
Attorney

Patented Oct. 1, 1940

2,216,577

UNITED STATES PATENT OFFICE 2,216,577

COMBINATION PISTON AND ROD

Crawford K. Stillwagon, Houston, Tex.

Application March 17, 1938, Serial No. 196,563

6 Claims. (Cl. 309—4)

This invention relates to a novel combination of piston and rod.

The invention discloses certain improvements over that type of piston and rod disclosed in my copending application Serial Number 164,453, filed September 18, 1937, now Patent Number 2,176,281, Oct. 17, 1939.

An object of the invention is to provide a novel type of piston mounted on, and secured to, the piston rod in a novel manner.

Another object of the invention is to provide a piston embodying an outer shell completely closed at one end to prevent leakage of fluid through between the piston and rod, with means for securely attaching the piston to the rod to prevent relative movement to the connected parts, said securing, or locking means being removable to permit the easy dismemberment of the assembly for renewal or replacement of parts.

It is a further object of the invention to provide a novel combination of the character described embodying a shell closed at one end and having a resilient covering securely held thereon with a rod having an enlarged head on one end fitted into the shell and a retainer nut or gland screwed into the open end of the shell about the rod and locking the rod and shell together as a unitary structure whereby relative movement between them may be prevented as the piston reciprocates.

Figure 1:
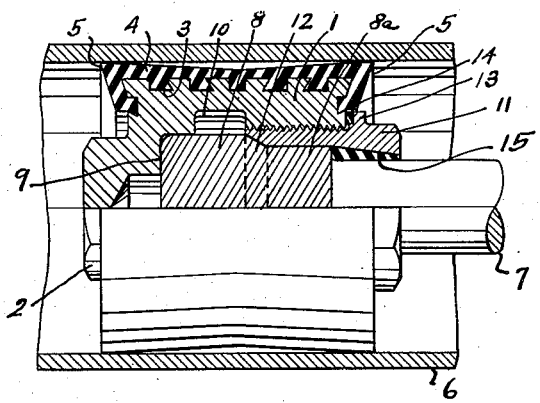
Figure 2:
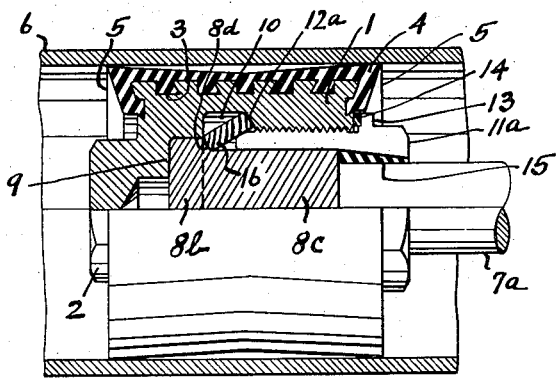
Figure 3:
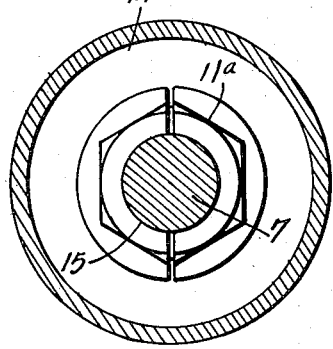

With the above and other objects in view, the invention has particular relation to certain novel features of construction, arrangement of parts and use, an example of which is given in this specification and illustrated in the accompanying drawing, wherein:

Figure 1 shows a side view of the piston partly in section as mounted in a pump liner and shown secured to the rod, Figure 2 shows a side view, partly in section, of another embodiment, and Figure 3 shows an end view of the embodiment shown in Figure 2.

Referring now more particularly to the drawing wherein like numerals of reference designate the same parts in each of the figures, the numeral 1 designates the shell of the piston which is open at one end and which is closed at the other end, said closed end having a polygonal projection 2 for the reception of a wrench. The shell is provided with annular grooves 3, preferably dovetailed in shape and the piston is covered with a resilient covering 4 of rubber or similar material moulded into said grooves. It is to be noted that the ends of the piston are concaved, the resilient covering terminating in the annular oppositely directed lips 5, 5 which fit closely against the inner walls of the pump liner 6. The piston is also annularly concaved, as shown, so that only the ends of the piston contact with the walls of the liner and the central circumferential portion of the piston will be spaced inwardly from the liner as shown.

The piston is thus specially adapted for use in pumping drilling fluid, or "slush." The numeral 7 designates the piston rod. In the embodiment shown in Figure 1, the end of the rod 7 within the shell is formed with an enlarged cylindrical head 8 whose free end abuts the inside annular shoulder 9 at the closed end of the shell, said head 8 fitting closely within the shell. Around the head the shell has an inside annular groove 10, the material removed to form said groove conducing to the lightness of the construction.

As shown in Figure 1 there is screwed into the open end of the shell a retainer nut or gland 11. The inner end of this nut is outwardly flared and fits closely against the annular tapering face 12 of the corresponding end of the head 8 so as to lock the shell securely on said head. The outer end of the nut 11 has an external annular rib 13 and between this rib and the corresponding end of the shell there is a packing ring 14. It will be noted that the head 8 has the reduced cylindrical portion 8a around which the nut 11 closely fits and outwardly beyond said reduced portion 8a, the inside of the nut converges or tapers outwardly and clamped between said tapering portion and the rod 7 is a packing sleeve 15. The packing 14 and 15 positively excludes the gritty fluid from the inner side of the shell. In the embodiment shown in Figure 2 it will be noted that the enlarged cylindrical portion 8b of the head is somewhat shorter than the portion 8 shown in Figure 1 and the reduced portion 8c is somewhat longer than the corresponding reduced portion 8a shown in Figure 1.

In assembling the type shown in Figure 2, the head may be inserted into the shell until its end abuts the inside shoulder 9 and a key 16 may then be inserted and engaged between the inside annular shoulder 12a of the shell formed by coring out the groove 10, and the external shoulder 8d formed by reducing the head. This key may be of any desired form preferably in the form of a split, flexible ring, sufficiently yieldable to provide for its insertion. It may be forced into place between the reduced portion 8c and the shell 1 before the retainer nut 11a is screwed into place and when its outer margin clears the shoulder 12a said margin will spring outwardly into interlocking relation with the shoulder 12a. The split retainer nut or gland 11a is then screwed into the open end of the shell closely surrounding the reduced portion 8c of the head and closely abutting the inside of the key 16 so as to lock it firmly in place. The shell is thus positively locked against movement relative to the rod. The nut or bushing 11a may be split longitudinally, thus forming it into sections so that it may be more readily assembled or dismembered from the assembly. In other respects the embodiment shown in Figure 2 is the same as that shown in Figure 1.

The drawing and description disclose what is now considered to be preferred forms of the invention by way of illustration only, while the broad principle of the invention will be defined by the appended claims.

What I claim is:

1. The combination with a shell approximately cylindrical in shape completely closed at one end and open at the other end, a rod having an enlarged head fitted into the shell, a retainer nut screwed into the open end of the shell and in interlocking relation with the head effective to prevent relative movement of the shell and rod, a resilient covering for the shell, packing means between the retainer nut and shell and packing means between the retainer nut and rod.

2. In combination an approximately cylindrical shell closed at one end and open at the other end, sealing means covering the shell, a piston rod having an enlarged head which is fitted into the shell and which abuts the closed end of the shell, a retainer nut screwed into the open end of the shell and whose inner end is in abutting relation with the head whereby the shell is locked against movement relative to the rod, and sealing means between the nut and shell and sealing means between the nut and rod.

3. The combination of a cylindrical shell closed at one end and open at the other end, sealing means on said shell, a rod having an enlarged head fitted into said shell through said open end, said head having a reduced portion, a nut fitted closely around said reduced portion and abutting against said head, sealing means between said shell and nut and between said nut and rod.

4. In combination a shell closed at one end and open at the other end, a series of outside annular grooves around the shell, sealing means anchored in said grooves, a piston rod having an enlarged head fitted into said shell through said open end, a retainer nut adapted to hold said shell against movement relative to the piston rod, said head having a reduced portion around which said retainer nut fits closely, an outwardly extending rib on said retainer nut, packing means between said rib and shell and between said retainer nut and rod.

5. The combination of a cylindrical shell being closed at one end and open at the other end, sealing means on said shell, a rod having an enlarged head fitted in said shell through said open end, said head having a reduced portion, a nut fitted closely around said reduced portion and abutting against said head, the inside surface of said nut converging outwardly beyond said reduced portion of the head, sealing means between said shell and nut and between said nut and rod.

6. The combination of a cylindrical shell closed at one end and open at the other end, sealing means on said shell, a rod having an enlarged head fitted in said shell through said open end, said head having a reduced portion, a nut fitted closely around said reduced portion and abutting said head, said nut having an outwardly extended annular rib, a packing ring between said rib and the shell, the inside surface of said nut converging outwardly beyond said reduced portion of the head, packing means between said nut and rod wedged tightly in place by the said converging surface.

CRAWFORD K. STILLWAGON.